2,874,603
NAIL WITH FRANGIBLE EXTENSION

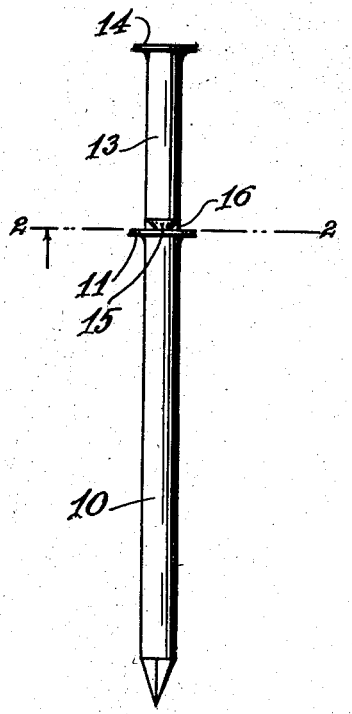
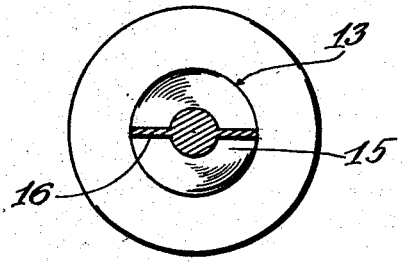
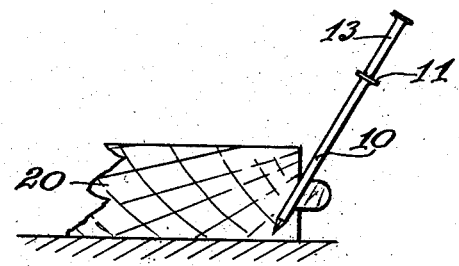
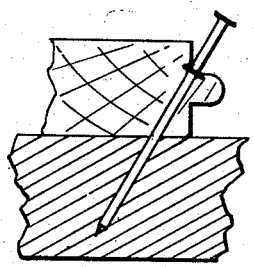
Fig. 1.
Fig. 2.
Fig. 3.
Fig. 4.
Wm. A. Boettcher
INVENTOR.
BY Stevens & Batchelor
Attorneys.

William A. Boettcher, Chicago, Ill.

Application May 25, 1956, Serial No. 587,375

2 Claims. (Cl. 85—28)

My invention relates to nails which are extended above the head in order to furnish a remote driving facility for the same. Thus, where a nail is to be driven into a flooring strip or other wood article, there is always the danger that the hammer will also hit the wood and mash the surface thereof, injuring the article or marring it. Thus, a nail made with an extension above the head affords a more distant driving point, so that the hammer will not come in contact with the part into which the nail is driven. Such extensions of nails as have come to my attention are formed with a reduced tip where they meet the regular head of the nail, so that after the same has been driven home, the extension can be broken off by a side blow from the hammer. However, the reduction of the extension renders it so weak that a glancing or even direct hammer blow may bend or break the extension off before the regular nail is driven home. It is therefore one object of the present invention to provide a doubleheaded nail which is formed with a reinforcement designed to keep the extension rigid during the driving thereof.

A further object is to provide a nail of the above character whose extension is formed with strengthening material in the region of its reduced portion, such material serving to keep the extension rigid as stated.

An additional object is to form webs in the region where the extension is reduced, such webs primarily strengthening the extension, but being of a frangible nature when the same is to be knocked off.

With the above objects in view, a better understanding of the invention may be had by reference to the accompanying drawing, in which Fig. 1 is an enlarged elevation of the nail;

Fig. 2 is a magnified section taken on the line 2—2 of Fig. 1;

Fig. 3 is a section of a flooring assembly showing the application of the nail; and Fig. 4 is a similar view showing the nail driven home and the extension ready for removal.

In according with the foregoing, specific reference to the drawing indicates the regular nail at 10, the same and its head 11 being of standard design. The nail 10 is continued above the head with an extension 13 which is considerably shorter than the regular nail and terminates at its upper end with a conventional head 14.

The extension 13 is tapered to a smaller diameter, as indicated at 15, where it meets the head 11 of the regular nail. The taper is preferably conical; and on opposite sides the tapered portion is extended with webs 16 which are relatively narrow, as shown in Fig. 2.

Constituted as described, the nail is suitable for driving into a flooring assembly 20 or any other part in the manner indicated in Fig. 3. While the tapered portion 15 of the extension primarily weakens the same where it meets the regular nail, the webs 16 combine to strengthen the union between the extension and the regular nail along a diametrical course. Thus, the extension and webs combine to reinforce the nail sufficiently to receive regular and even glancing hammer blows as the nail is driven home. However, when this function has been completed, the weakened region formed by the tapered portion 15 is depended upon to break the extension away from the regular nail when the extension is given one or more lateral blows of the hammer. Now, the webs 16 may pivot at the bottom to break away simultaneously with the tapered portion. Thus, the webs do not hamper or deter the breaking function of the nail extension. Further, the extension enables the nail to be driven to a point where its regular head becomes fully embedded in the stock of the flooring strip, as seen in Fig. 4, leaving a clearance for the full application of the next flooring strip. Finally, the improvement in the nail may be formed by simply designing the stamping die accordingly, so that no extra expense is incurred by the improvement.

While I have described the invention along specific lines, various minor changes or refinements may be made therein without departing from its principle, and I reserve the right to employ all such changes and refinements as may come within the scope and spirit of the appended claims.

I claim:

1. A nail having a shank portion terminating in a point at one end and including a transverse head at the other end thereof, a nail-driving extension body aligned with said shank portion, a frangible portion integrally connecting said extension body to the upper portion of the head of said nail, said frangible portion including an annular centrally arranged frusto-conical portion converging axially from said extension body into the head of said nail, and diametrically opposed web portions extending laterally from and integral with said frusto-conical portion and frangibly integral with upper surface portion of the nail head and extending substantially to said extension body, said web portions having a thickness less than the minimum diameter of the frusto-conical portion, said frusto-conical and web portions combining to permit the axial transmittal of driving force from said driving-head for placing the nail in a holding position with a work piece and being severable thereat from the head of the nail after it has been driven.

2. The structure of claim 1 in which the shank and extension body have a circular cross section.

References Cited in the file of this patent

UNITED STATES PATENTS

| | | |
|---|---|---|
| 162,643 | Goddy | Apr. 27, 1875 |
| 975,235 | Hansen | Nov. 8, 1910 |
| 1,511,746 | Noll | Oct. 14, 1924 |
| 2,575,079 | Temple | Nov. 13, 1951 |